Patented Mar. 24, 1953

2,632,754

UNITED STATES PATENT OFFICE 2,632,754

STABILIZATION OF SYNTHETIC RUBBER WITH NEW STANNOUS COMPLEXES OF AROMATIC AMINES

Harry E. Albert, Akron, Ohio, assignor to The Firestone Tire & Rubber Company, Akron, Ohio, a corporation of Ohio No Drawing. Application December 5, 1947, Serial No. 790,023

19 Claims. (Cl. 260—45.75)

Stannous complexes of aromatic amines usually contain about 60 to 80 per cent of tin. In many cases the amount of amine present in the complex is so small that it is difficult to determine the nitrogen present by the ordinary Kjeldahl method, using a sample of the ordinary size. The balance of the complexes is, apparently, composed largely of oxygen and chlorine or other inorganic material derived from the acid used in producing the complex. Any water-soluble stannous salt of a strong acid may be used, such, for example, as stannous chloride, stannous bromide, stannous sulfate, stannous benzenesulfonate, stannous toluenesulfonate, stannous naphthalenesulfonate, etc. The complexes are water-insoluble and form valuable stabilizers for natural and synthetic rubbers, such as the rubber-like copolymers of butadiene and styrene known as GR–S.

The stannous complexes may be made by the reaction of such a stannous salt, an amine, and the hydroxide of an alkali metal, for example, sodium hydroxide or potassium hydroxide. The amine may be a primary, secondary or tertiary aromatic amine, such as diethylaniline, thiodiphenylamine, phenyl - beta - naphthylamine, alpha-naphthylamine, dimethyl-alpha-naphthylamine, ortho-aminodiphenyl, ethylaniline, 1-amino-2-naphthol, p-aminodiphenyl, N-cyclohexylaniline, p-phenylenediamine, etc.

The stannous amine complexes may, for example, be prepared as illustrated in the following examples:

*Example 1.—Stannous complex of diphenylamine*

Thirty-three and eight-tenths grams of diphenylamine and 22.6 grams of stannous chloride dihydrate were dissolved in 300 cubic centimeters of 95 per cent alcohol. Eight grams of sodium hydroxide in 200 cubic centimeters of 50 per cent alcohol were then added slowly during stirring. The precipitate was filtered, washed twice with alcohol and once with water, and then dried. It was a light gray solid which weighed 16 grams. This material was, apparently, unchanged after heating 1 hour at 150° C. On heating to higher temperatures, it decomposed before it melted. Analysis showed the stannous amine complex to contain 79.25 per cent tin.

A second batch of the above stannous complex similarly prepared analyzed 76.10 per cent tin, 3.14 per cent chlorine, and 0.04 per cent nitrogen.

*Example 2.—Stannous complex of diethylaniline*

Seventy-four and five-tenths grams of diethylaniline were added to a solution of 56.5 grams of stannous chloride dihydrate in 900 cubic centimeters of 95 per cent ethyl alcohol. A small amount of white precipitate resulted. Twenty grams of sodium hydroxide in 200 cubic centimeters of 60 per cent alcohol were added dropwise during stirring. This produced a very considerable precipitate which was filtered, washed twice with alcohol, once with water, and then once again with alcohol. The yield of cream-colored product was 39 grams. It was, apparently, unchanged by heating 1 hour at 150° C. On heating on a spatula over an open flame, little color change was observed, even when the temperature was sufficiently high to make the spatula a dull red. Analysis showed the stannous amine complex to contain 74.25 per cent tin.

*Example 3.—Stannous complex of thiodiphenylamine*

One hundred grams of thiodiphenylamine and 56.4 grams of stannous chloride dihydrate were dissolved in 500 cubic centimeters of acetone and 1 liter of alcohol. A solution of 20 grams of sodium hydroxide in 300 cubic centimeters of 60 per cent alcohol was added slowly during stirring. The precipitate was filtered, washed with acetone, then with acetone-alcohol, and finally with water. The yield of cream-colored product was 33 grams. This material was, apparently, unchanged by heating 1 hour at 150° C. On heating on a spatula over an open flame, the complex decomposed to a brown color. This changed to gray and finally to a light gray color at a dull red heat. Analysis showed the stannous amine complex to contain 74.50 per cent tin.

*Example 4.—Stannous complex of phenyl-beta-naphthylamine*

One hundred nine grams of phenyl-beta-naphthylamine were dissolved in 1500 cubic centimeters of warm alcohol and 100 cubic centimeters of benzene. The solution was filtered and 56.4 grams of stannous chloride dihydrate dissolved in it. A solution of 20 grams of sodium hydroxide in 300 cubic centimeters of 60 per cent alcohol was added slowly during stirring. The product was filtered, washed twice with alcohol, and once with water. The light gray-brown product obtained weighed 44 grams. This material was, apparently, unchanged after heating 1 hour at 150° C. On heating on a spatula over an open flame, the color changed from light gray to cream. No other change was observed up to a dull red heat. Anaylsis showed the stannous amine complex to contain 62.15 per cent tin.

*Example 5.—Stannous complex of alpha-naphthylamine*

Fifty-six and five-tenths grams of stannous chloride dihydrate and 71.5 grams of alpha-naphthylamine were dissolved in 800 cubic centimeters of 95 per cent ethyl alcohol. Some precipitate was formed during this operation. Twenty grams of sodium hydroxide in 200 cubic centimeters of 50 per cent alcohol were slowly added during stirring. The resulting precipitate was washed twice with alcohol, once with water, and then twice with alcohol. The yield of air-dried product, light gray in color, was 43.5 grams. On heating at 150° C. for 1 hour, no change was apparent. On heating on a spatula over an open flame, a brown color was observed which changed to a cream color as a dull red heat was approached. Analysis showed the stannous amine complex to contain 70.15 per cent tin, 3.25 per cent chlorine, and 0.037 per cent nitrogen.

To illustrate the stabilizing effect of stannous amine complexes, the results of various tests are recorded below. They relate more particularly to the stabilization of a rubber-like copolymer of a conjugated diene monomer and a vinyl aromatic monomer, but are illustrative of the broader aspects of the invention according to which these complexes may be used in the stabilization of natural and synthetic rubbers. They are particularly useful as nondiscoloring stabilizers for rubber-like copolymers of a conjugated diene monomer and a vinyl aromatic monomer, of which GR–S is typical. Conjugated diene monomers which may be used in producing rubber-like synthetics of this type include butadiene, isoprene, 2 - cyanobutadiene, cyclopentadiene, piperylene, dimethylbutadiene, 2-methyl-1,3-petadiene, etc. The compound generally identified by the generic term "butadiene" is butadiene 1-3. The vinyl aromatic monomers which may be used in producing such rubber-like copolymers include styrene, alpha-methylstyrene, nuclear-substituted styrenes, monochlorostyrene, dichlorostyrene, vinylnaphthalene, vinylbiphenyl, vinylcarbazole, 2-vinyl-5-ethylpyridine, 2-ethyl-5-vinylpyridine, etc.

The copolymer is advantageously formed by emulsion copolymerization. The stabilizer may be added to the latex resulting from the copolymerization, to the coagulum obtained from it, or to the dried product. If the latter, the stabilizer is best incorporated by milling. When added to the latex, it may be stirred in, and it has a beneficial stabilizing effect during the drying of the coagulum.

The first two of the following tables illustrate the stabilizing effect of the amine complexes (prepared as above) on drying and aging of GR–S copolymer. The effect of the complexes is compared with that of a commercial stabilizer identified herein as Stabilizer No. 1. Changes in color are noted as well as the results of a hand test which consisted of feeling and pulling the copolymer to determine to what extent it had set up or deteriorated. The stabilizers were added to the latex resulting from emulsion copolymerization of butadiene and styrene.

TABLE I

Copolymer aging test

|  | Stannous Complex of Diphenylamine | Stabilizer No. 1 |
|---|---|---|
| After drying 20 hours at 75° C.: |  |  |
| Color | Very light greenish yellow. | Dark gray. |
| Hand test | No deterioration. | No deterioration. |
| Heat-aging at 110° C.: |  |  |
| Two Days— |  |  |
| Color | Light yellow. | Gray-brown. |
| Hand test | No deterioration. | No deterioration. |
| Four Days— |  |  |
| Color | Dark cream. | Gray-brown. |
| Hand test | No deterioration. | Somewhat set up. |
| Plasticity T-10 | 6.0 | 18.4. |

In the table the plasticity test designated as "T–10" is recorded as the time in seconds required to extrude a constant volume of rubber through a given opening by the use of a piston activated at a constant pressure of 10 pounds of steam at a constant temperature of 185° F. in an extrusion plastometer of the type described in Dillon et al. 2,045,548.

The above data show the stannous complex of diphenylamine to be superior to the commercial stabilizer.

In the following table the effects of the stabilizers of this invention are compared with the effects of the same commercial stabilizer and also phenyl-beta-naphthylamine.

TABLE II

Copolymer aging test

| Stabilizer | After Drying 20 Hours at 75° C., Color and Hand Test | Heat-aging at 110° C. | |
|---|---|---|---|
|  |  | Two Days, Color and Hand Test | Four Days, Color and Hand Test |
| stannous complex of diphenylamine. | Cream color; no deterioration. | Cream color; unchanged. | Dark cream color; unchanged. |
| stannous complex of phenyl-beta-naphthylamine. | Light greenish-yellow; no deterioration. | Light gray; unchanged. | Light gray; unchanged. |
| stannous complex of thio-diphenylamine. | Light yellow; no deterioration. | Dark cream color; unchanged. | Dark cream color; unchanged. |
| stannous complex of di-ethylaniline. | Tan; no deterioration. | ____do____ | Do. |
| stannous complex of alpha-naphthylamine. | Medium light brown; no deteriorarion. | Light gray; unchanged. | Gray; unchanged. |
| Stabilizer No. 1. | Green-gray; no deterioration. | Brown; slightly set up. | Dark brown; somewhat set up. |
| phenyl-beta-naphthylamine. (control). | Brown; no deterioration. | Brown; unchanged. | Brown; somewhat set up. |

The above data show the superiority of the stannous complexes over both commercial stabilizers, not only in color but also in retention of original plasticity.

GR–S copolymer containing 2 per cent of various stabilizers was compounded and then cured, and tests were conducted on the cured stock. The compounding formula is given below:

FORMULA

| | Parts by weight |
|---|---|
| Copolymer containing 2% stabilizer | 100.00 |
| Coumarone resin | 10.00 |
| Triethyl trimethylene triamine | 1.10 |
| Magnesium oxide | 8.00 |
| Wax | 2.00 |
| Zinc oxide | 100.00 |
| Ultramarine blue | 0.10 |
| Titanium dioxide pigment | 30.00 |
| Sulfur | 4.00 |

The various stocks were cured 30, 50 and 70 minutes at 300° F. Portions of each stock were aged in an oven four days at 100° C. These different rubbers were subjected to physical tests, and the average values for the three cures are recorded in the following table:

TABLE III

Physical tests

| | Stannous Complex of Diethylaniline | Stannous Complex of Phenyl-beta-naphthylamine | Stabilizer No. 1 |
|---|---|---|---|
| 300% Modulus: | | | |
| Normal | 425 | 400 | 360 |
| Aged | 840 | 835 | 735 |
| Percent of Normal | 197.5 | 208.5 | 204.5 |
| Tensile: | | | |
| Normal | 1,000 | 950 | 1,050 |
| Aged | 1,110 | 1,000 | 1,120 |
| Percent of Normal | 111 | 105 | 106.5 |
| Elongation: | | | |
| Normal | 420 | 405 | 450 |
| Aged | 335 | 325 | 345 |
| Percent of Normal | 80 | 80.3 | 76.7 |

The above data show the two stannous amine complexes to be equivalent to the commercial stabilizer in retention of original modulus and tensile on aging. Both tin complexes were slightly superior to it in elongation retention.

Exposure tests were conducted to determine the susceptibility of the compounds to discoloration. The stock used for the discoloration tests was the same white zinc oxide stock compounded according to the above formula. The stock tested was cured 50 minutes at 300° F.

TABLE IV

Artificial exposure tests

| Stabilizer | Fadeometer at 125° F. | | G. E. Sunlamp at 7 inches | |
|---|---|---|---|---|
| | 5 Hours | 10 Hours | 8 Hours | 16 Hours |
| stannous complex of phenyl-beta-naphthylamine | White | Light cream | White | White. |
| stannous complex of thiodiphenylamine | do | do | do | Do. |
| stannous complex of diethylaniline | do | do | do | Do. |
| stannous complex of alpha-naphthylamine | do | do | do | Do. |
| Stabilizer No. 1 (control) | Dark tan | Medium brown | Tan | Dark tan. |

Further exposure tests were made by exposure to natural sunlight in Akron, Ohio. The tests were conducted on tapered dumbbell strips of stock compounded according to the above formula and cured 50 minutes at 300° F. The strips were stretched 12½ per cent during the tests. The results are recorded in the following table:

TABLE V

Natural exposure test

| Stabilizer | After 1 Month (May-June) | After 4 Months (May-September) |
|---|---|---|
| stannous complex of phenyl-beta-naphthylamine | White | White. |
| stannous complex of thiodiphenylamine | do | Do. |
| stannous complex of diethylaniline | do | Do. |
| stannous complex of alpha-naphthylamine | do | Do. |
| stannous complex of diphenylamine | do | Do. |
| Stabilizer No. 1 (control) | Light tan | Tan. |

The tests are illustrative of the stabilizing effect of the stannous complexes on various rubbers. The invention is not limited to the details described, but is defined in the appended claims.

What I claim is:

1. Water-insoluble stannous amine complexes which are composed about 60 to 80 per cent by weight of combined tin and contain a small amount of combined aromatic amine, and are obtained by rendering alkaline a solution of an aromatic amine and a stannous salt of a strong acid.

2. Water-insoluble stannous amine complexes of which about 60 to 80 per cent by weight is combined tin and in which there is a small amount of combined aromatic amine and a small amount of combined oxygen, said complexes being obtained by rendering alkaline a solution of an aromatic amine and a stannous salt of a strong acid.

3. Water-insoluble stannous amine complexes of which about 60 to 80 per cent by weight is combined tin and in which there is a small amount of combined aromatic amine and a small amount of combined chlorine and combined oxygen, said complexes being obtained by rendering alkaline a solution of an aromatic amine and a stannous salt of a strong acid.

4. A water-insoluble stannous amine complex of diphenylamine obtained by rendering alkaline a solution of diphenylamine and a stannous salt of a strong acid.

5. A water-insoluble stannous amine complex of alpha-naphthylamine obtained by rendering alkaline a solution of alpha-naphthylamine and a stannous salt of a strong acid.

6. The process of producing water-insoluble stannous amine complexes which comprises dissolving in a common solvent an aromatic amine and a water-soluble stannous salt of a strong acid, and then reacting with the hydroxide of an alkali metal.

7. The process of producing water-insoluble stannous amine complexes which comprises dissolving an aromatic amine and stannous chloride in a common solvent and then reacting with sodium hydroxide.

8. The process of producing a water-insoluble stannous amine complex of diphenylamine which comprises dissolving in an alcohol solvent the amine and a water-soluble stannous salt of a strong acid, and then reacting with the hydroxide of an alkali metal.

9. The process of producing a water-insoluble stannous complex of diphenylamine which comprises dissolving the amine and stannous chloride in a common solvent and then reacting with the hydroxide of an alkali metal.

10. The process of producing a water-insoluble stannous complex of alpha-naphthylamine which comprises dissolving in an alcohol solvent the amine and a stannous salt of a strong acid and then reacting with the hydroxide of an alkali metal.

11. The process of producing a water-insoluble stannous complex of alpha-naphthylamine which comprises dissolving the amine and stannous chloride in a common solvent and then reacting with the hydroxide of an alkali metal.

12. Rubber-like copolymer of butadiene and a vinyl aromatic monomer stabilized with a water-insoluble stannous amine complex which is composed of a small amount of combined aromatic amine and about 60 to 80 per cent by weight of combined tin, said complex being obtained by rendering alkaline a solution of an aromatic amine and a stannous salt of a strong acid.

13. Rubber-like copolymer of a conjugated diene monomer and a vinyl aromatic monomer stabilized by the presence therein of a water-insoluble stannous amine complex of which about 60 to 80 per cent by weight is combined tin and in which there is a small amount of combined aromatic amine and a small amount of combined oxygen, said complex being obtained by rendering alkaline a solution of an aromatic amine and a stannous salt of a strong acid.

14. Rubber-like copolymer of butadiene and styrene stabilized by the presence therein of a water-insoluble stannous amine complex which is composed of about 60 to 80 per cent by weight of combined tin and in which there is a small amount of combined aromatic amine and a small amount of combined chlorine and a small amount of combined oxygen, said complex being obtained by rendering alkaline a solution of an aromatic amine and a stannous salt of a strong acid.

15. The process of drying rubber-like copolymer of a butadiene and styrene which comprises drying the same while there is incorporated therein a water-insoluble stannous amine complex of which about 60 to 80 per cent by weight is combined tin and in which there is a small amount of combined aromatic amine and a small amount of combined oxygen, said complex being obtained by rendering alkaline a solution of an aromatic amine and a stannous salt of a strong acid.

16. The process of preparing a vulcanizate of rubber-like copolymer of a conjugated diene monomer and a vinyl aromatic monomer without substantial discoloration which comprises curing a mixture of the copolymer and vulcanizing ingredients which include as a stabilizer a water-insoluble stannous amine complex of which about 60 to 80 per cent is combined tin and in which there is a small amount of combined aromatic amine, said complex being obtained by rendering alkaline a solution of an aromatic amine and a stannous salt of a strong acid.

17. The process of drying coagulum of rubber-like copolymer of butadiene and styrene without substantial discoloration which comprises heating the same while it contains as a stabilizer a water-insoluble stannous amine complex of which about 60 to 80 per cent is combined tin and in which there are small amounts of combined aromatic amine, oxygen and chlorine, said complex being obtained by rendering alkaline a solution of an aromatic amine and a stannous salt of a strong acid.

18. A water-insoluble stannous amine complex of phenyl-beta-naththylamine, said complex being obtained by rendering alkaline a solution of phenyl-beta-naphthylamine and a stannous salt of a strong acid.

19. A water-insoluble stannous amine complex of a secondary aryl amine, said complex being obtained by rendering alkaline a solution of a secondary aryl amine and a stannous salt of a strong acid.

HARRY E. ALBERT.

REFERENCES CITED

The following references are of record in the file of this patent:

UNITED STATES PATENTS

| Number | Name | Date |
|---|---|---|
| 2,269,498 | Wainer | Jan. 13, 1942 |
| 2,461,498 | Krueger | Feb. 8, 1949 |
| 2,476,661 | Hart | July 19, 1949 |

OTHER REFERENCES

Leeds: J. Am. Chem. Soc., 3, page 145 (1881).
Beilstein, vol. 12, page 127 (1929).
Degering: "Outline of Organic Nitrogen Compounds," page 304, University Lithoprinters, Ypsilanti, Mich. (1945).